Feb. 27, 1923.
L. D. WINDMILLER.
DIRECTION SIGNAL FOR MOTOR VEHICLES.
FILED MAR. 27, 1922.
1,446,732.
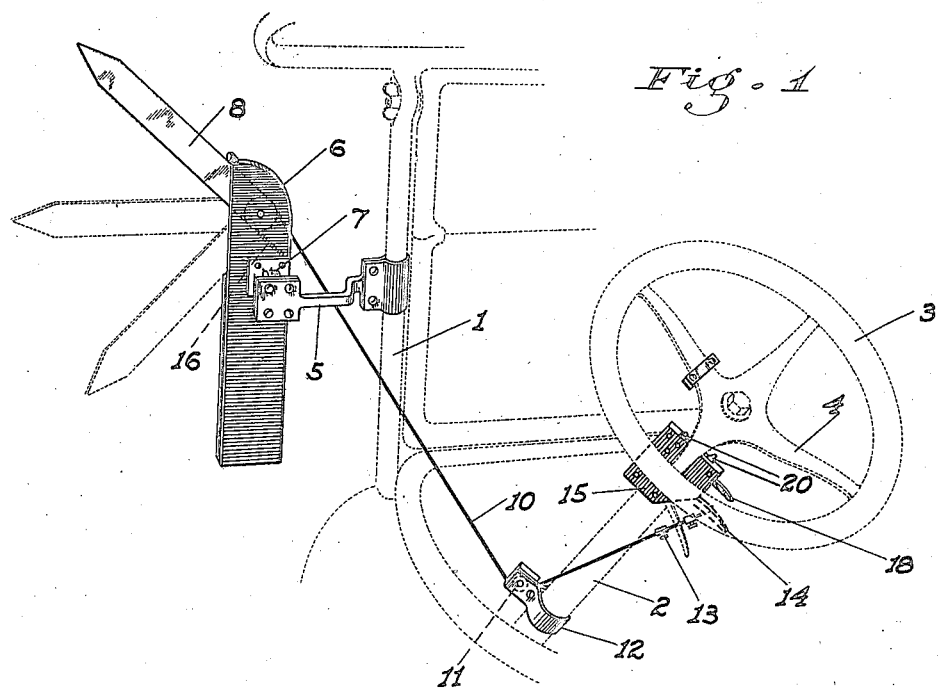
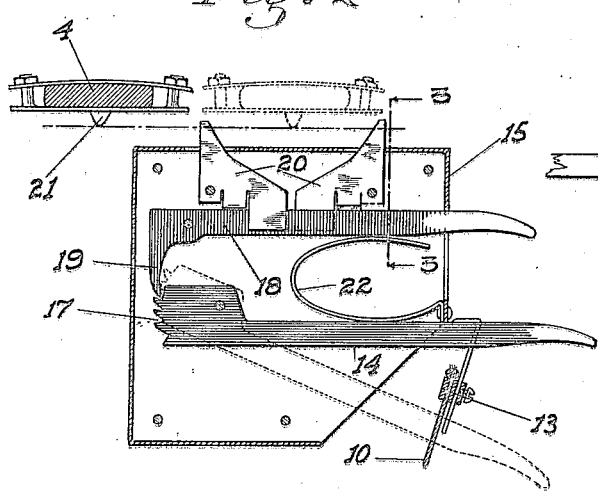
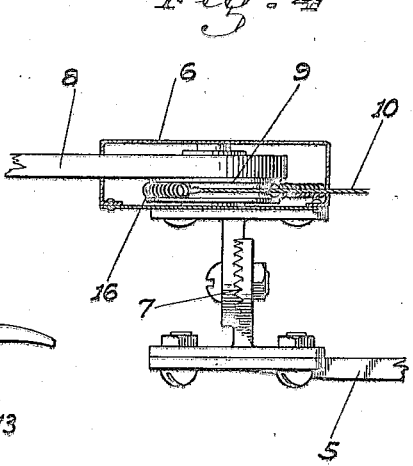
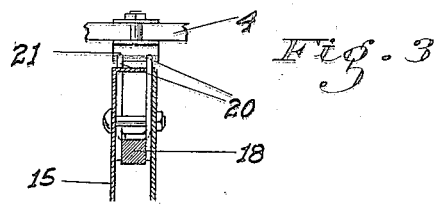
INVENTOR.
L. D. Windmiller
BY
ATTORNEY Patented Feb. 27, 1923.

1,446,732

UNITED STATES PATENT OFFICE.

LOUIS D. WINDMILLER, OF SACRAMENTO, CALIFORNIA.

DIRECTION SIGNAL FOR MOTOR VEHICLES.

Application filed March 27, 1922. Serial No. 547,036.

*To all whom it may concern:*

Be it known that I, LOUIS D. WINDMILLER, a citizen of the United States, residing at Sacramento, county of Sacramento, State of California, have invented certain new and useful Improvements in Direction Signals for Motor Vehicles; and I do declare the following to be a full, clear, and exact description of the same, reference being had to the accompanying drawings and to the characters of reference marked thereon, which form a part of this application.

This invention relates to improvements in motor-vehicle signal means, and particularly to the operating means for that type of mechanical signal which corresponds to and takes the place of the human arm as generally used.

The principal object of my invention is to provide, in connection with a signal arm adapted to be moved to different angular positions, a means for setting the signal to any position by hand, and further means for automatically causing the signal to drop and move out of sight when the steering wheel is brought back to a position corresponding to a straight fore-and-aft alinement of the wheels, after a turn either to the right or to the left has been made.

This device therefore reduces the work of the driver, and prevents the very common sight of the signal member remaining extended long after a turn has been completed.

At the same time, means is provided for unsetting the signal by hand, without interfering with the automatic feature.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a perspective outline of a portion of a motor vehicle, showing my signal structure installed thereon.

Fig. 2 is an enlarged detached view of the signal operating mechanism, the casing in which it is enclosed being in section.

Fig. 3 is a fragmentary cross section on the line 3—3 of Fig. 2.

Fig. 4 is a top plan view of the signal member itself and its supporting means, the signal-box being in section.

Referring now more particularly to the characters of reference on the drawings, the numeral 1 denotes the wind-shield frame of a motor car, having the usual steering column 2, steering wheel 3 and spokes 4 for the latter.

Clamped onto the frame 1 is a bracket 5 which extends outwardly of said frame a suitable distance and supports at its outer end a vertically disposed signal-casing 6. Between the casing and the bracket is an adjustable clamp-joint 7, so that the casing may be moved to assume a truly vertical position irrespective of the alinement of the frame 1.

Pivoted in the casing adjacent the upper end thereof is the signal arm 8, preferably in the form of a pointed bar and painted white.

Mounted in common with the arm is a pulley 9 to which is fixed one end of a wire or cable 10 which passing therearound then extends to and around a pulley 11 mounted in bracket 12 clamped about the column 2 at a suitable point thereon. The cable then extends upwardly alongside said column to a termination in a vertically adjustable sleeve member 13 mounted in connection with and depending from an arm 14 pivotally mounted in casing 15 clamped to the column 2 just under the wheel 3.

The signal 8 is normally held down and concealed in its housing 6 by a spring 16 arranged in connection therewith, the action of this spring keeping the cable 10 in tension and drawing the arm 14 to its lowermost position also.

The arm 14 projects outwardly of the casing a distance sufficient for it to be readily moved by the operator, and on its inner end, beyond its pivotal connection, is provided with a plurality of concentrically disposed notches 17, corresponding in number to the number of positions at which the signal 8 may be set.

Then when the arm 14 is raised, the signal 8 is likewise raised to be displayed, the spring 16 acting to resist this movement, besides the natural weight of the signal tending to cause it to drop. The arm 14 must therefore be held in any desired position without depending on the hand of the operator to hold it, and this is done by means of an arm 18 pivoted in the casing above the arm 14 and provided on its inner end with a fixed pawl 19 adapted to engage the notches 17, these being arranged with relation to the pawl so that the arm 14 is then held from downward movement unless the pawl 19 is raised from engagement with the notches.

This may be done in two ways. First, the arm 18 projects from the casing a sufficient distance to enable it to be depressed by the finger. Second, I mount in the casing 15 above the arm 18 two opposed and substantially L shaped trip members 20, pivoted at their corners or angles.

The horizontal portions of these strips bear on the upper face of the arm 18 beyond its pivotal connection and on that portion opposite to the pawl portion.

The vertical arms of this trips project above the upper edge of the casing and above the lower edge of a trip-lug 21 mounted to and under an adjacent spoke 4 of the wheel 3. These vertical portions of the trips 20 are spaced far enough apart so that the lug 21 may have a certain amount of movement therebetween without contact, and the casing 15 is so disposed relative to the spoke to which said lug is attached so as to bring the lug in this position when the steering wheel 3 is moved to bring the vehicle-wheels in straight fore-and-aft alinement.

In operation, presume that the signal 8 has been set to indicate a right hand turn, as shown in Fig. 1. The steering wheel 3 in making this turn, is moved so that the lug 21 is moved ahead of the forward trip 20 which is the left-hand one in Fig. 2. In so moving past said trip, no movement is imparted to the arm 18, since the trip simply raises away from the said arm.

When the wheel is reversed to again straighten out the car after the turn is made, the lug 21 again engages and moves past the trip 20. This time however, the horizontal arm of the trip is depressed, which raises the pawl end of the arm or lever 18, freeing the arm 14 and allowing the same and the signal 8 to drop.

When a left hand turn is made, the same action takes place, but movement to the arm 18 is imparted through the medium of the other trip.

In order to prevent possible sluggish movement of the arms, a spring 22 is placed therebetween, acting on both simultaneously to hold the notches and pawl in positive engagement.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An operating structure for pivoted vehicle-signal arms including a pivoted arm operatively connected to said arm and adapted to be manually moved to set the signal, pawl and ratchet means for holding the arm when the signal is set whereby the signal is also held, hand means for releasing the pawl, and means acting on said hand means and actuated by the return of the steering wheel of the vehicle to a normal position after a turn has been made.

2. An operating structure for pivoted vehicle-signal arms including a pivoted arm operatively connected to said arm and adapted to be manually moved to set the signal, pawl and ratchet means for holding the arm when the signal is set whereby the signal is also held, a lever connected with said pawl and arranged to be manually depressed to release the pawl, trip means independent of but arranged to act on said lever to depress the same, and means carried by the steering wheel of the vehicle for actuating said trip means as the said wheel is moved in a predetermined direction.

3. An operating structure for pivoted vehicle-signal arms including a pivoted arm operatively connected to said arm and adapted to be manually moved to set the signal, a catch mechanism for holding the arm when the signal is set whereby the signal is also held, a lever connected with said mechanism and arranged to be manually depressed to release the same, independent and oppositely isposed trip members mounted to act on and depress said lever, and a lug carried by the steering wheel of the vehicle and positioned to engage and actuate either at a time of said trip members with a movement of said steering wheel in predetermined directions.

4. An operating structure for pivoted vehicle-signal arm including a pivoted arm operatively connected to said arm and adapted to be manually moved to set the signal, pawl and ratchet means for holding the arm when the signal is set whereby the signal is also held, a lever connected with said pawl and arranged to be manually depressed to release the pawl, independent and oppositely disposed trip members mounted to act on and depress said lever, and a lug carried by the steering whel of the vehicle and positioned to engage and move the trip members when the lug is moved therepast with the turning of the steering wheel and means whereby the trips will only act to depress the lever when moved in predetermined and opposite directions.

5. A device as described comprising a casing arranged to be clamped under the steering wheel of a motor vehicle, an arm pivoted in the casing, means for normally holding the arm at one end of its possible travel, notches on the inner end of said arm, a pawl adapted to normally engage said notches, a lever connected to said pawl pivotally mounted in the casing and adapted to be manually moved to release the pawl, L-shaped trips pivoted in opposite relation in the casing and bearing on the lever on the portion thereof opposite to the pawl, said trips projecting above the casing, and a lug fixed on the steering wheel at a predetermined point and positioned to engage and actuate said trip members when the steering wheel is turned.

In testimony whereof I affix my signature.

LOUIS D. WINDMILLER.